(12) United States Patent
Yoo

(10) Patent No.: US 6,932,561 B2
(45) Date of Patent: Aug. 23, 2005

(54) POWER GENERATION SYSTEM

(75) Inventor: Woo Sik Yoo, Palo Alto, CA (US)

(73) Assignee: WaferMasters, Inc., San Jose, CA (US)

( * ) Notice: Subject to any disclaimer, the term of this patent is extended or adjusted under 35 U.S.C. 154(b) by 0 days.

(21) Appl. No.: 10/677,511

(22) Filed: Oct. 1, 2003

(65) Prior Publication Data

US 2005/0074324 A1 Apr. 7, 2005

(51) Int. Cl.⁷ .............................. F03D 1/02; F03D 1/04
(52) U.S. Cl. ...................... 415/4.3; 415/4.5; 415/60; 415/66; 415/68; 415/147; 416/10; 416/125
(58) Field of Search ........................... 415/2.1, 4.1–4.5, 415/60, 66, 68, 147, 905, 908; 416/9–12, 120, 124, 125, 132 B

(56) References Cited

U.S. PATENT DOCUMENTS

| | | | | |
|---|---|---|---|---|
| 1,495,036 A | * | 5/1924 | Palmer | 415/908 |
| 1,876,595 A | * | 9/1932 | Beldimano | 415/2.1 |
| 4,025,220 A | * | 5/1977 | Thompson et al. | 415/908 |
| 4,140,433 A | * | 2/1979 | Eckel | 415/4.5 |

FOREIGN PATENT DOCUMENTS

| | | | | |
|---|---|---|---|---|
| FR | 2450362 A | * | 9/1980 | 415/4.5 |
| GB | 249011 A | * | 3/1926 | 415/4.5 |

* cited by examiner

Primary Examiner—Christopher Verdier
(74) Attorney, Agent, or Firm—MacPherson Kwok Chen & Heid LLP; Tom Chen

(57) ABSTRACT

A wind power system is provided including at least one generator fan having a front face and a rear face. The system also includes a first wind capturing device positioned proximate to the front face. The wind capturing device can be configured to capture wind to create a first pressure proximate to the front face that is greater than a second pressure proximate to the rear face. The pressure difference causes the captured wind to flow across the at least one generator fan from the front face to the rear face.

11 Claims, 5 Drawing Sheets

POWER GENERATION SYSTEM

BACKGROUND

1. Field of Invention

The present invention relates to a wind power system for generating electrical power.

2. Related Art

A typical wind power system includes two or three blades which rotate about an axis. The blades are provided perpendicular to the direction of wind flow, with suitable pitch so that the wind causes the blades to rotate about the axis. The rotational motion of the blades is used to drive a gear box that drives a generator, effectively converting the kinetic energy of the wind to electrical energy.

Unfortunately, typical wind power systems require large propeller-like blades, which can be inefficient, to the point of being useless. Large blades are generally required to ensure that the blades can be rotated with sufficient speed to overcome the torque inherent in the generator. Inefficiencies are created due to considerable friction in the gear box, which adds to the torque. Thus, during instances of low or moderate wind flow, the wind strength may not be able to overcome the torque.

The large blades usually cover an expansive area. Thus, the blades within this area can be subject to winds traveling in different directions. For example, wind traveling near one end of the expansive blades can be heading north while wind at the opposite end of the expansive blades can be heading south. The net effect of the different wind directions traveling across different parts of the blades can be to slow or even stop the blades causing the power output to approach zero.

Each of these factors contributes to the cost of the wind power system, operations, and maintenance, which add considerably to the cost of the power generated.

What is needed therefore is a wind power generation system, which overcomes the shortcomings of typical wind power generation systems to provide a wind power generation system, which operates in varying wind conditions, in changing wind directions and with increased efficiency.

SUMMARY

The present invention discloses a wind power generation system to operate in various wind conditions and with changing wind directions. The system provides a reliable and effective means for directing air currents into and out of fan generators positioned strategically within the power generation system.

The system of the present invention operates without requiring large blades and is capable of producing power using kinetic energy from high winds, as well as low and moderate winds.

Generally, the invention includes a wind capturing device that resembles a sail in performance. The wind capturing device effectively forces captured wind to form a high pressure area on a first side of at least one generator fan. The high pressure air travels across the generator fan to an area of lower pressure at a second side of the at least one generator fan.

Multiple wind power generation systems can be positioned together to form a large array of power generation systems which form a power unit. In this manner, a large expansive area can be exposed to the wind. As explained in detail below, since each power system in the array operates independent of the other power systems, the direction of wind impinging on the expansive array does not adversely affect the power output.

In one aspect of the invention, a wind power system is provided including at least one generator fan having a front face and a rear face. The wind power system also includes a first wind capturing device positioned proximate to the front face configured to capture wind and create a first pressure proximate to the front face that is greater than a second pressure proximate to the rear face. The differing pressure causes the captured wind to flow across the at least one generator fan from the front face to the rear face. The wind capturing device includes deformable portions to direct the captured wind and create the first pressure.

In another aspect of the invention, a wind power system is provided including a first plurality of generator fans horizontally stacked including at least a front generator fan and a rear generator fan. The system also includes a first wind capturing sail positioned proximate to the front generator fan configured to capture wind to create a first pressure proximate to the front generator fan that is greater than a second pressure proximate to the rear generator fan which causes the captured wind to flow across the first plurality of generator fans.

Advantageously, the power generation system provides a sail-like wind capturing device that is capable of capturing winds of variable velocities and conditions, because the shape of the wind capturing device can be adjusted, similar to the manner of adjusting a wind sail. Since the sail can be sized and shaped to take full advantage of suspected wind conditions in a given application, the size of the power generator can be optimized and made smaller.

These and other features and advantages of the present invention will be more readily apparent from the detailed description of the embodiments set forth below taken in conjunction with the accompanying drawings.

DETAILED DESCRIPTION

Figure 1A:
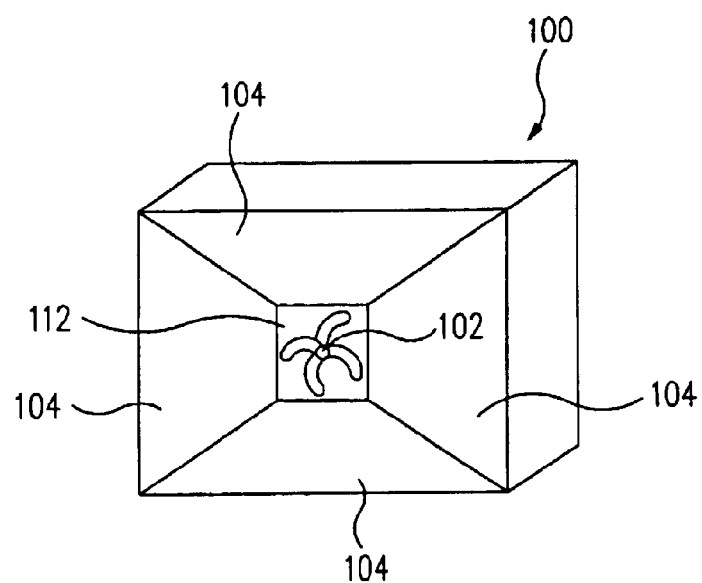
FIG. 1A is a simplified illustration of a perspective view of a wind power system in accordance with an embodiment of the present invention.
Figure 1B:
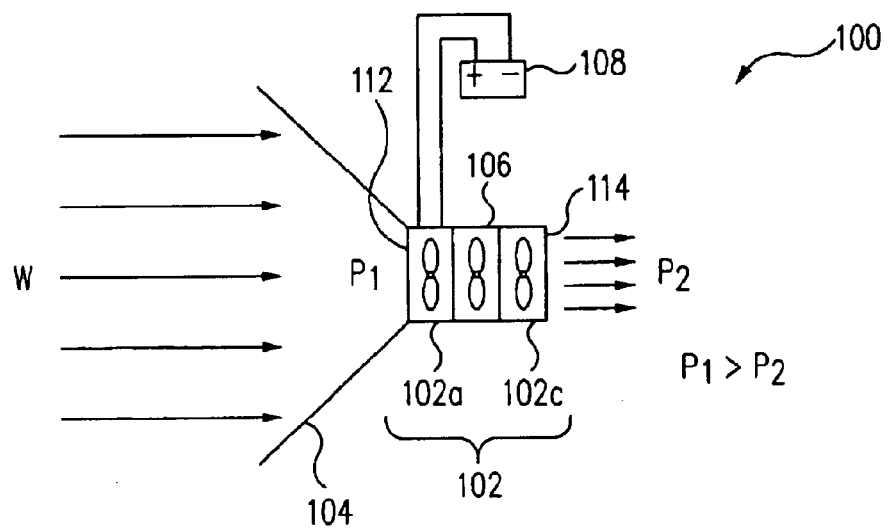
FIG. 1B is a simplified cross sectional side view of a wind power system in accordance with an embodiment of the present invention.

FIGS. 1A and 1B are simplified illustrations showing a wind power system 100 in accordance with an embodiment of the present invention. Wind power system 100 includes at least one generator fan 102, which functions as an electric drive generator, centered within wind capturing devices 104.

The principles of the invention are described in connection with a relatively small power system 100 using any relatively small to medium sized generator fan 102. Generator fan 102 can be a direct current (DC) generator, or a generator producing alternating current (AC), also known as an alternator. In one embodiment, generator fan 102 is a 1 to 100 V DC motor having a capacity to generate between about 0.5 to about 10,000 Watts of electrical power. Motors suitable for use in the present invention are widely known and are available, for example, from McMaster-Carr Supply Company.

Depending upon the specific use of power system 100, the current produced can be introduced directly into an existing power grid through the use of synchronizers or stored in an electrical storage device, such as a battery 108. Optionally, power system 100 can be used to directly drive or power specific pieces of electrical equipment.

Referring again to FIGS. 1A and 1B, wind capturing devices 104 can include any device capable of capturing and directing wind into a fixed location. In one embodiment, wind capturing devices 104 are configured as flexible sheets capable of capturing wind in a manner resembling a sail on a sail boat. The flexible sheets may be made of typical sail materials, such as canvas, nylon and the like. The sheet of wind capturing material is positioned on the four sides of generator fan 102 to create a funneling affect. Since wind capturing device 104 is made of wind capturing materials like canvas and nylon, it has a deformability that allows the wind capturing device to act similar to a sail on a sail boat when subjected to wind. Thus, like a sail, wind capturing device 104 can be deformed by the wind or by other means to form a shape capable of producing a force coefficient that attempts to maintain as high of a pressure in front of generator fan 102 as possible at all wind velocities.

The aerodynamic pressure (force per unit of sail area, $P_1$) generated by a sail is proportional to the square of the wind velocity ($W^2$), the force coefficient ($C_F$, determined by shape and sheeting angle), and the air's density ($\rho$). The following formula defines these relationships:

$$\text{Pressure } (P_1) = \tfrac{1}{2} \rho C_F W^2$$

The total aerodynamic pressure may be split into two components—a lift component which is perpendicular to the flow and a drag component which is in the same direction of the flow. These components are both proportional to the "sheeting" angle. As the sheeting angle decreases, drag increases to a maximum. By controlling the sheeting angle of wind capturing device 104, pressure $P_1$ can be maximized at a front face 112 of generator fan 102.

As illustrated in FIG. 1A, wind capturing device 104 can be mounted about each side of generator fan 102. Each wind capturing device 104 can be controlled independently and made to force wind into the front face 112 of generator fan 102 by changing shape or angle. The shape changing ability of wind capturing device 104 can generally be controlled by the wind as is done with a sail or using manual or automatic techniques, which employ the use of pulleys and motors.

As illustrated in FIG. 1B, in one embodiment, wind W is captured in wind capturing devices 104 and a pressure $P_1$ is created proximate to front face 112 of generator fan 102. Since a pressure $P_2$ exists proximate to a rear face 114 of generator fan 102 which is less than pressure $P_1$, wind travels across generator fan 102 to cause the fan blades to turn, thus generating a current in the fan.

Figure 1C:
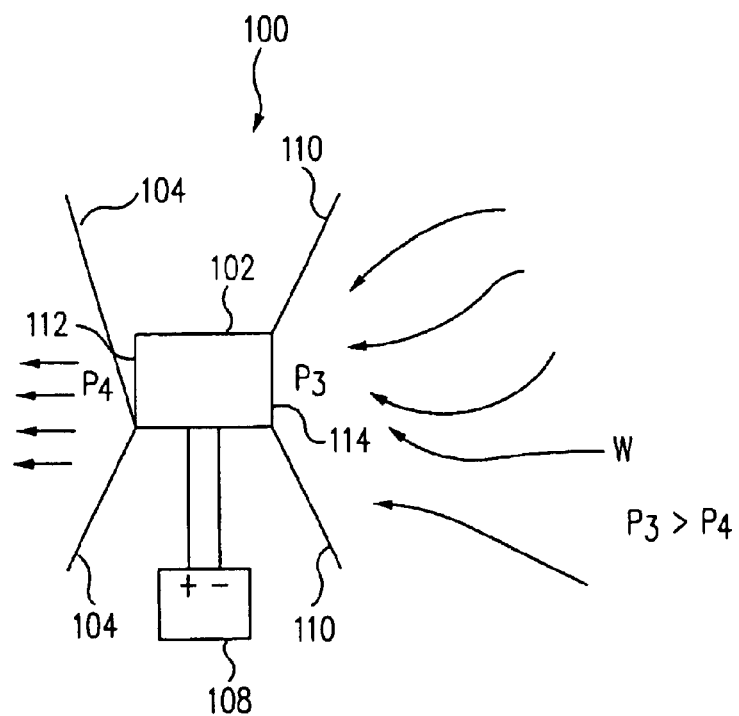
FIG. 1C is a simplified cross sectional side view of an embodiment of the wind power system in accordance with the present invention.

In another embodiment, as shown in FIG. 1C, a second set of wind capturing devices 110 may be mounted about rear face 114 of generator fan 102 in similar fashion to the mounting of wind capturing devices 104 relative to front face 112.

In this embodiment, wind captured in wind capturing devices 110 creates a pressure $P_3$ proximate to rear face 114 of generator fan 102. Since a pressure $P_4$ exists proximate to front face 112 of generator fan 102, which is less than pressure $P_3$, wind travels across generator fan 102 to cause the fan blades to turn, thus generating a current in the fan. Accordingly, wind arriving at power generation system 100 from either direction can be used to turn generator fan 102.

Referring again to FIG. 1B, the at least one generator fan 102 can include any number of generator fans horizontally stacked. In one embodiment, generator fan 102 may include at least three horizontally stacked generator fans. The horizontally stacked generator fans include front generator fan 102a, a rear generator fan 102c, and optionally, one or more middle generator fans 102b disposed therebetween. It should be understood that while three generator fans have been shown for purposes of simplicity, the principles of the invention can be used for horizontal stacks containing a plurality of fans interposed between generator fans 102a and 102c.

In this embodiment, as the wind travels across the front generator fan 102a it can be assumed that not all of the wind's kinetic energy is converted to electrical power. Thus, the wind continues to pass along until it reaches middle generator fan(s) 102b, which converts more of the wind's kinetic energy to electrical energy. Finally, any remaining wind kinetic energy is converted to electrical power, at least in part, by the remaining rear generator fan 102c.

Figure 1D:
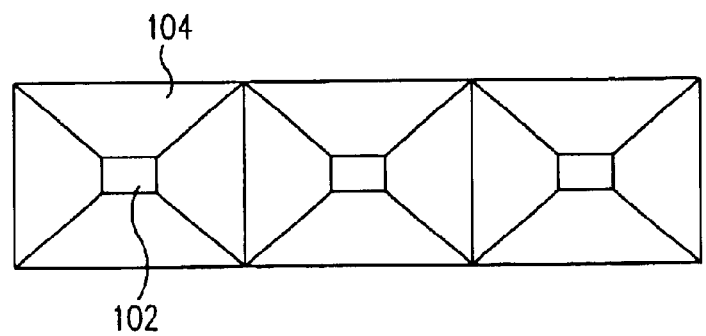
FIG. 1D is a simplified front side view of an embodiment of the wind power system in accordance with the present invention.

Depending upon the amount of power desired to be produced and the location of power system 100, a plurality of generator fans 102 and a variety of arrangements of generator fans 102 can be used. In one embodiment, the arrangement should be such that the generator fans 102 are arranged side-by-side horizontally as shown in FIG. 1D.

Figure 2A:
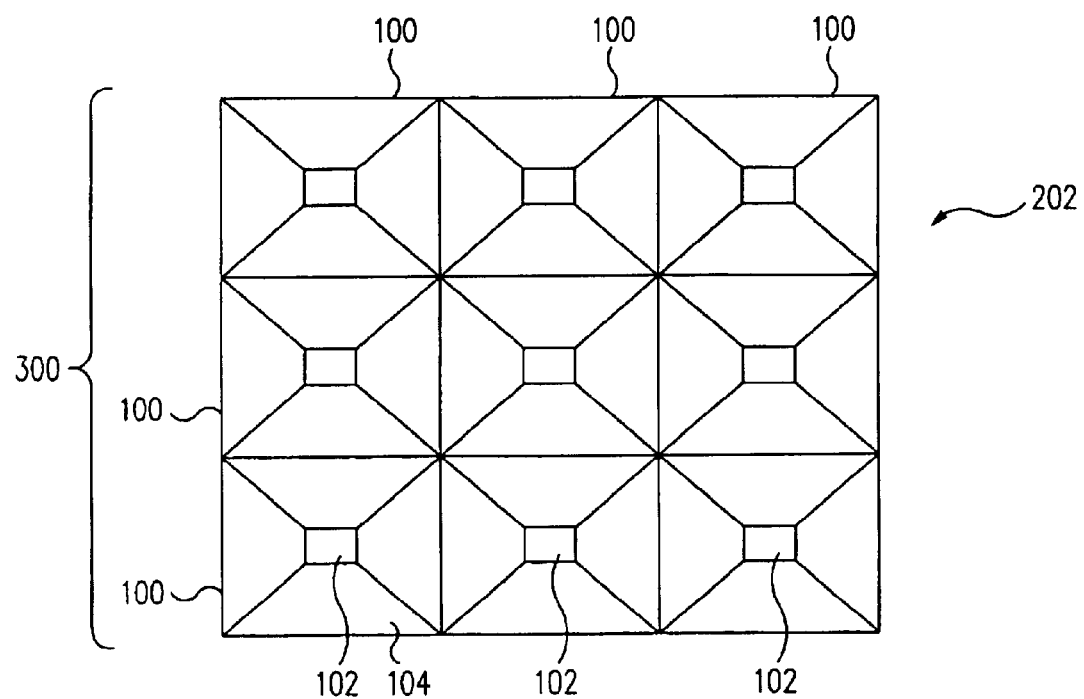
FIGS. 2A and 2B are simplified illustrations of an array of generator fans in accordance with embodiments of the present invention.
Figure 2B:
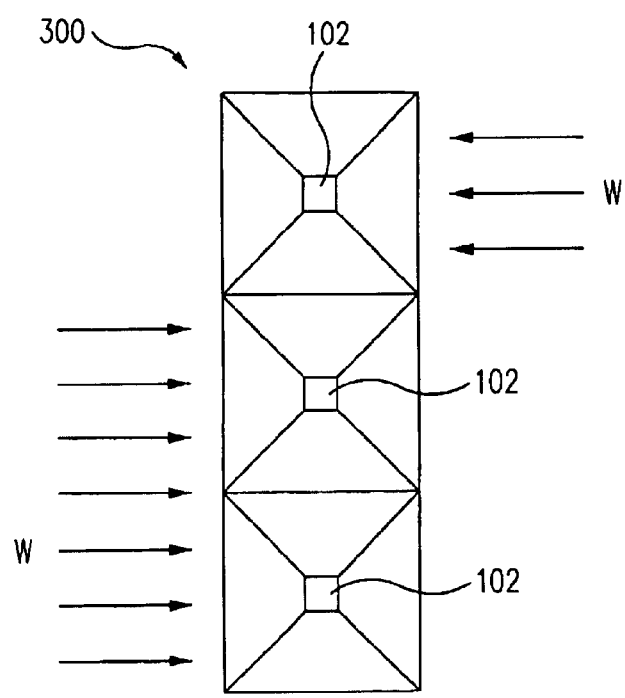

In yet another embodiment, as shown in FIGS. 2A and 2B, a vertical stack of, for example, three vertical power systems 100 is mounted along side multiple stacks of three other power systems 100 to form an array 202 of power systems.

The configuration of power system 100 into an array of multiple power systems ranging from a two side-by-side power system configuration to N×N configurations, allows for a large expansive power unit 300 to be created. The size of power unit 300 is only limited by the power need and space available and therefore can rival any of the largest propeller-type fan structures. However, as the size of power unit 300 is increased, it becomes subject to the possibility that winds may impinge on array 202 from opposing directions as shown in FIG. 2B. However, array 202 is made of multiple power systems 100, each of which can receive wind from a front or rear direction. Although, power unit 300 may be expansive, each power system 100 is exposed to only a small portion of the impinging winds. Thus, each power system is more likely to receive wind from only one direction and so can still independently produce electrical power.

Figure 5:
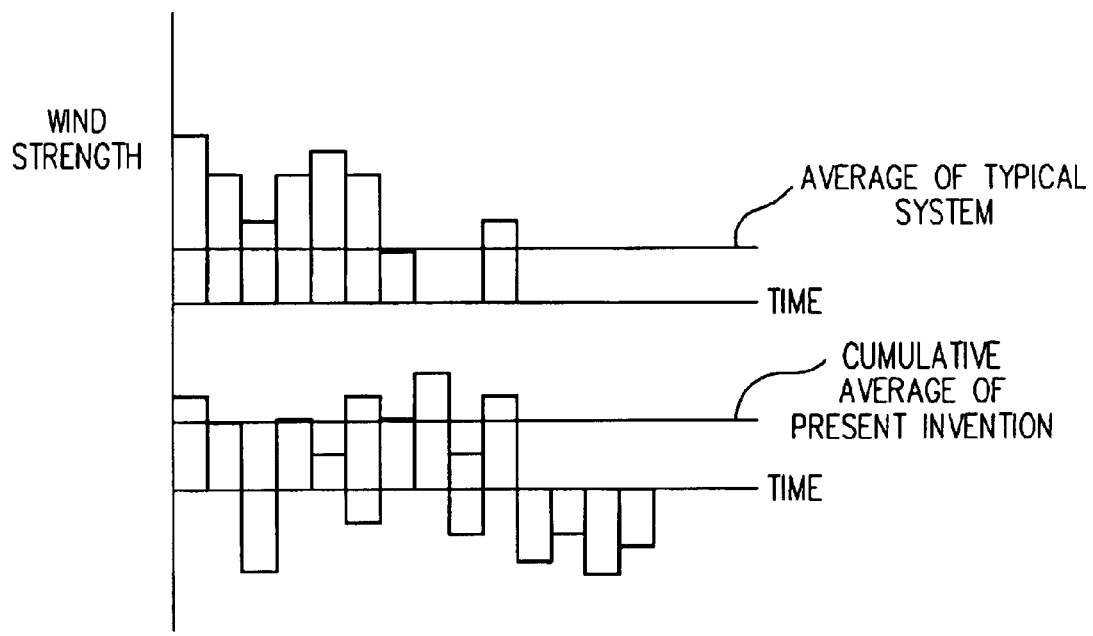
FIG. 5 is a graph comparing average power as a function of wind strength and wind direction between a typical system and the present invention.

Accordingly, the average power output from power unit 300 can be higher than typical wind power generating systems. As shown in FIG. 5, in typical power system generators the total average power is the power generated over time relative to the strength of the wind in a single direction. However, the total power generated by power unit 300 is the average of each individual power system 100 regardless of wind direction. Thus, the average power is the sum of the absolute value of each individual power system.

Figure 4:
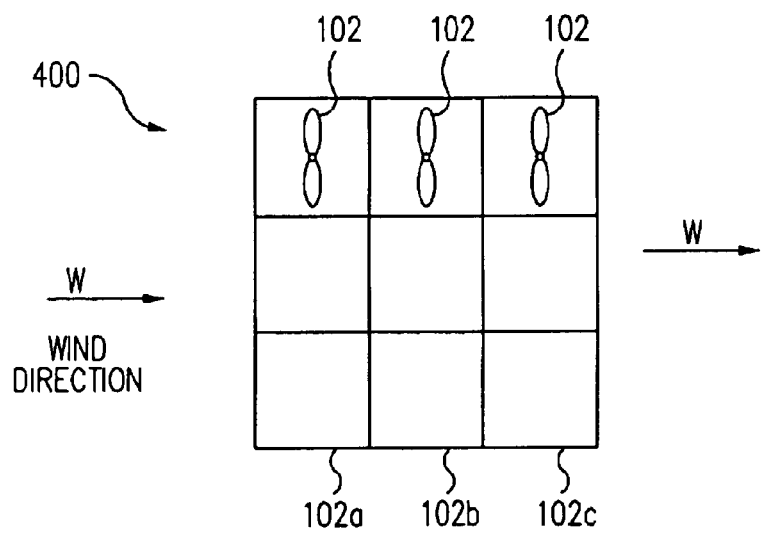
FIG. 4 is a simplified perspective view of a multiple array of power systems in accordance with an embodiment of the present invention.

Alternatively, each generator fan 102 shown in power system array 202 of FIG. 2A can be a front generator fan 102a of a horizontally stacked configuration of power systems 100 like that shown in FIG. 1B, which forms a configuration like that shown in FIG. 4.

Figure 3A:
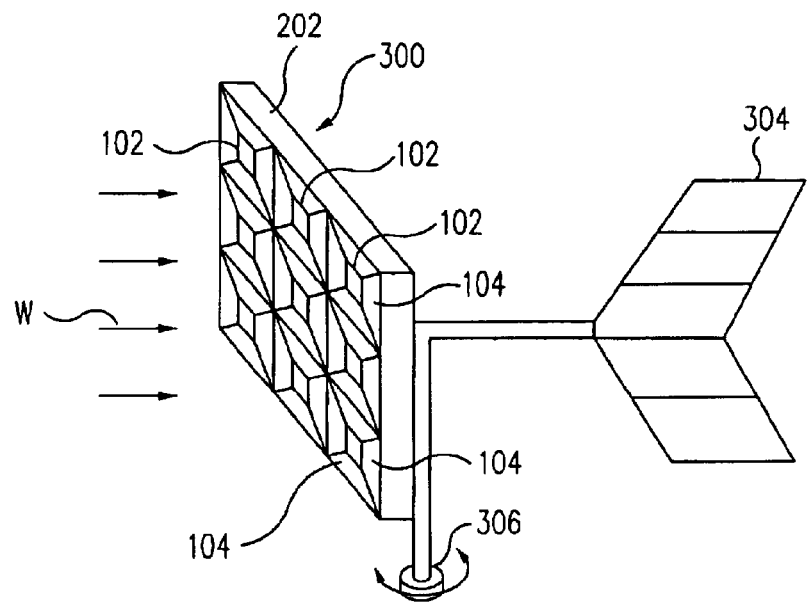
FIGS. 3A and 3B are simplified perspective views of an array of power systems mounted to a wind vane in accordance with two embodiments of the present invention.
Figure 3B:
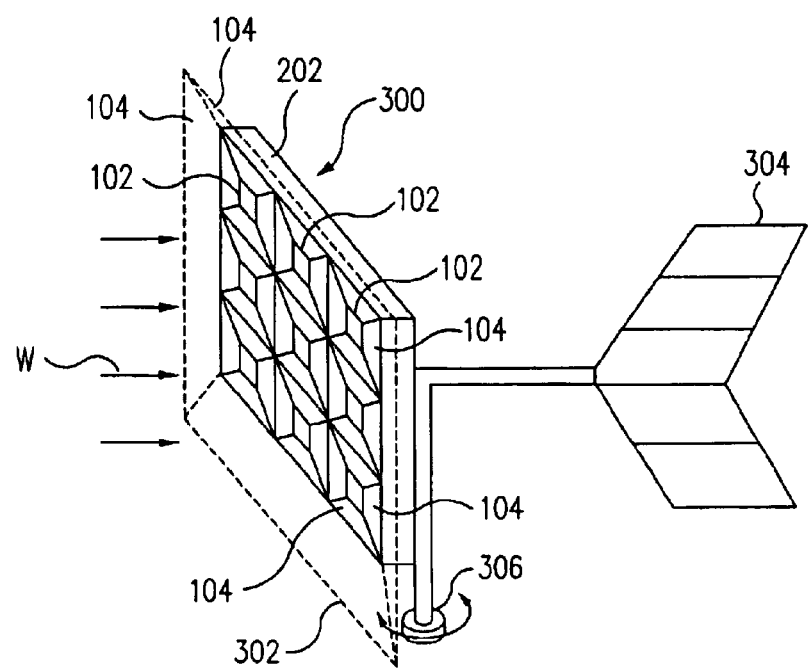

In yet another embodiment, as shown in FIG. 3A, an array 202 of power systems, including wind capturing devices 104, forms power unit 300 that can be to wind vane 304 so that power unit 300 can orient itself about a pivot point 306 to the wind direction W as the direction of the wind W changes. The performance of wind vane 304 is well known. The size and shape of wind vane 304 can be determined based on the size of power unit 300. In one embodiment, shown in FIG. 3B, an additional wind capturing device 302 having capturing devices 104 may be mounted to the entire power unit 300 to provide additional funneling of wind to power unit 300.

Having thus described embodiments of the present invention, it will be evident to those of ordinary skill in the art that modifications can be made to the embodiments described herein without departing from the spirit and scope of the invention set forth in the following claims.

What is claimed is:

1. A wind power system comprising:
   a first plurality of generator fans horizontally stacked including at least a front generator fan and a rear generator fan; and
   a first wind capturing sail positioned proximate to said front generator fan configured to capture wind to create a first pressure proximate to said front generator fan that is greater than a second pressure proximate to said rear generator fan which causes said captured wind to flow across said first plurality of generator fans.

2. The wind power system of claim 1, further comprising a second plurality of horizontally stacked generator fans.

3. The wind power system of claim 2, wherein said first plurality and said second plurality of horizontally stacked generator fans are vertically stacked.

4. The wind power system of claim 1, wherein said plurality of horizontally stacked generator fans comprises an N×N array of horizontally stacked generator fans.

5. The wind power system of claim 1, wherein said first wind capturing device comprises a canvas sheet.

6. The wind power system of claim 1, further comprising a vertically oriented pole coupled to said horizontally stacked generator fans to allow said horizontally stacked generator fans to be rotated.

7. The wind power system of claim 6, further comprising a self adjusting wind vane to cause said plurality of generator fans to rotate about said vertically oriented pole in a direction facing an oncoming wind.

8. The wind power system of claim 1, further comprising a second wind capturing device positioned proximate to said rear generator fan to create a third pressure proximate to said rear generator fan that is greater than said first pressure proximate to said front generator fan which causes said captured wind to flow across said plurality of generator fans.

9. The wind power system of claim 1, wherein said plurality of generator fans generates from between about 0.5 to about 10,000 watts of energy.

10. The wind power system of claim 1, wherein said wind capturing device comprise a plurality of wind capturing devices substantially surrounding said at least one generator fan.

11. The wind power system of claim 1, wherein said generator fans are alternator fans.

* * * * *